United States Patent
Madden et al.

(10) Patent No.: US 10,109,852 B2
(45) Date of Patent: Oct. 23, 2018

(54) ELECTRODES FOR ENERGY STORAGE DEVICES AND METHODS FOR THEIR PREPARATION

(71) Applicant: EMPIRE TECHNOLOGY DEVELOPMENT LLC, Wilmington, DE (US)

(72) Inventors: Thomas Madden, Glastonbury, CT (US); Christopher J. Rothfuss, Laramie, WY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 165 days.

(21) Appl. No.: 14/666,058

(22) Filed: Mar. 23, 2015

(65) Prior Publication Data

US 2016/0285085 A1 Sep. 29, 2016

(51) Int. Cl.
*H01M 4/36* (2006.01)
*H01M 4/587* (2010.01)
(Continued)

(52) U.S. Cl.
CPC ............. *H01M 4/366* (2013.01); *H01M 4/13* (2013.01); *H01M 4/587* (2013.01); *H01M 4/60* (2013.01);
(Continued)

(58) Field of Classification Search
CPC ........ H01M 4/366; H01M 4/13; H01M 4/587; H01M 4/60; H01M 4/663; H01M 4/667; H01M 10/054; H01M 10/0565
See application file for complete search history.

(56) References Cited

U.S. PATENT DOCUMENTS

| 4,485,154 A | 11/1984 | Remick et al. |
| 6,689,513 B1 * | 2/2004 | Morigaki ................ H01M 4/13 429/231.95 |

(Continued)

FOREIGN PATENT DOCUMENTS

| WO | WO2008/124167 | * 10/2008 |
| WO | WO2012037171 | 3/2012 |

OTHER PUBLICATIONS

Dichiara et al., Chemical Vapor Deposition Synthesis of Carbon-Nanotube-graphene nanosheet Hybrids and Their Application in Polymer Composites, 2012, Journal of nanoscience and nanotechnology, vol. 12, 1-6.*

(Continued)

*Primary Examiner* — Helen Oi K Conley

(57) ABSTRACT

Electrodes that include at least one active material layer, and at least one graphitized carbon structure layer are disclosed. The active material layer may include an active metal ion complex. The at least one active material layer may form an active material stack that includes a positive active material layer, a negative active material layer, and an electrolyte layer disposed between the positive active material layer and the negative active material layer. The electrode may be configured as an energy storage structure. The energy storage structure may include a first graphitized carbon structure layer, a second graphitized carbon structure layer, and an active material stack disposed between the first graphitized carbon structure layer and the second graphitized carbon structure layer. Methods of making energy storage structures are also disclosed.

23 Claims, 4 Drawing Sheets

(51) Int. Cl.
H01M 4/60 (2006.01)
H01M 4/13 (2010.01)
H01M 4/66 (2006.01)
H01M 10/054 (2010.01)
H01M 10/0565 (2010.01)

(52) U.S. Cl.
CPC ........... *H01M 4/663* (2013.01); *H01M 4/667* (2013.01); *H01M 10/054* (2013.01); *H01M 10/0565* (2013.01)

(56) References Cited

U.S. PATENT DOCUMENTS

2008/0297980 A1 12/2008 Bourcier et al.
2013/0037760 A1 2/2013 Maeda et al.

OTHER PUBLICATIONS

Li et al, Controlled growth of carbon nanotubes on graphite foild by chemical vapor deposition 2001, Chemical Physics Letters 335 (2001) 141-149.*
Anderson, T., "Advanced Materials for Flow Batteries," in Electrical Energy Storage Peer Review, Sep. 28, 2012, pp. 10.
Anderson, T., "Synthesis of an ionic liquid with an iron coordination cation," Dalton Trans., vol. 39, No. 37, pp. 8609-8612 (2010).
Arges, C. G. et al., "Anion Exchange Membrane Fuel Cells," The Electrochemical Society Interface, vol. 19, No. 2, pp. 31-35 (2010).
Chen, D. et al., "Composite Blend Polymer Membranes with Increased Proton Selectivity and Lifetime for Vanadium Redox Flow Batteries," Journal of Power Sources, vol. 231, pp. 301-306 (2013).
Chen, D. et al., "Synthesis of Sulfonated Poly(Fluorenyl Ether Thioether Ketone)s with Bulky-Block Structure and Its Application in Vanadium Redox Flow Battery," vol. 52, No. 23, Polymer, pp. 5312-5319 (2011).
Clarke, S., "Some lessons learned from 20 years in RedOx Flow Battery R&D," in DOE Flow Battery Workshop, Washington DC, pp. 21 (2012).
Couture, G. et al., "Polymeric Materials as Anion-Exchange Membranes for Alkaline Fuel Cells," Progress in Polymer Science, vol. 36, No. 11, pp. 1521-1527 (2011).
Dudney, N., "Thin-Film Micro-Batteries," Electrochemical Society Interface, pp. 44-48 (2008).
Endo, M. et al., "Vapor-Grown Carbon Fibers (VGCFs): Basic properties and their battery applications," Carbon, vol. 39, No. 9, pp. 1287-1297 (2001).
Endo, M. et al., "The production and structure of pyrolytic carbon nanotubes," Journal of Physics and Chemistry of Solids, vol. 54, No. 12, pp. 1841-1848 (1993).
Skyllas-Kazacos, M. et al.,"Recent advances with UNSW vanadium-based redox flow batteries," International Journal of Energy Research, vol. 34, No. 2, pp. 182-189 (2010).
Winter, C., "Flow Batteries—Commercialization and the Economics of Manufacturing," pp. 40-41, in International Flow Battery Forum (2011).
Zhensheng, M. et al., "Nafion/Polyvinylidene Fluoride Blend Membranes with Improved Ion Selectivity for Vanadium Redox Flow Battery Application," Journal of Power Sources, vol. 196, No. 13, pp. 5737-5741 (2010).
Dixon, N.E. et al., "Trifluoromethanesulfonates and Trifluoromethanesulfonato-O Complexes," in Inorganic Syntheses: Reagents for Transition Metal Complex and Organometallic Syntheses, vol. 28, pp. 70-76 (1990).

* cited by examiner

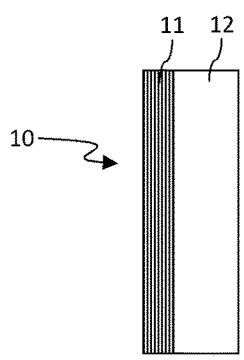 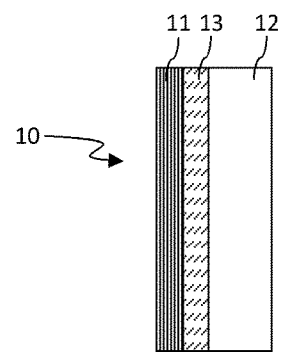
FIG. 1A  FIG. 1B
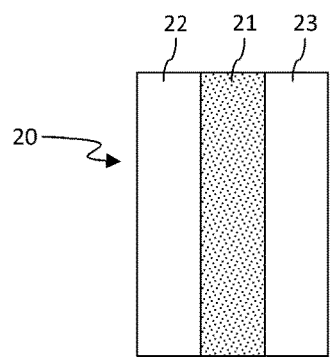
FIG. 2
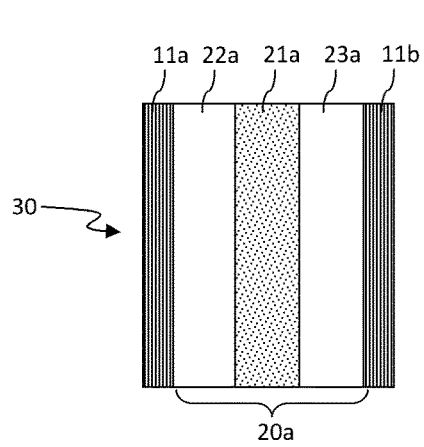 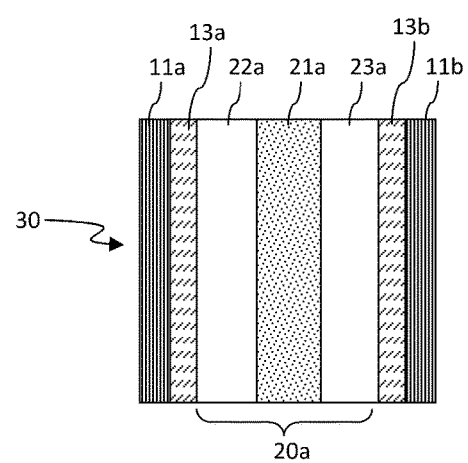
FIG. 3A  FIG. 3B

ELECTRODES FOR ENERGY STORAGE DEVICES AND METHODS FOR THEIR PREPARATION

BACKGROUND

The highly competitive nature of the consumer electronics industry has created a stream of products with ever-increasing capabilities. However, the power requirements of these devices are usually directly proportional to the increasing number of capabilities of the products. This increase in power requirements, among other factors, has produced a growing consumer demand for electronic equipment with reduced battery recharge time, extended battery life, increased product life, lower cost of production, improved portability, and reduced environmental impact. To accommodate these demands, the consumer electronics industry is trending toward devices that are smaller and lighter in weight, require reduced maintenance, and have longer cycle and calendar life. In order to meet these requirements, new energy storage technologies will need to be developed to achieve these specifications.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

In some embodiments, an electrode includes at least one active material layer and at least one graphitized carbon structure layer. The active material layer includes an active metal ion complex.

In some embodiments, an active material stack includes a positive active material layer; a negative active material layer; and an electrolyte layer disposed between the positive active material layer and the negative active material layer.

In some embodiments, an energy storage structure includes a first graphitized carbon structure layer; a second graphitized carbon structure layer; and a first active material stack disposed between the first graphitized carbon structure layer and the second graphitized carbon structure layer; wherein the first active material stack includes a first positive active material layer; a first negative active material layer; and a first electrolyte layer disposed between the first positive active material layer and the first negative active material layer.

In some embodiments, a method of making an energy storage structure includes forming a first graphitized carbon structure layer; disposing a first active material stack on the first graphitized carbon structure layer, wherein the first active material stack includes a first positive active material layer, a first negative active material layer, and a first electrolyte layer disposed between the first positive active material layer and the first negative active material layer; and disposing a second graphitized carbon structure layer on the first active material stack.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIGS. 1A and 1B are cross-sectional views of an electrode in accordance with some embodiments.

FIG. 2 is a cross-sectional view of an active material stack in accordance with some embodiments.

FIGS. 3A and 3B are cross-sectional views of an energy storage structure in accordance with some embodiments.

DETAILED DESCRIPTION

Figure 4A:
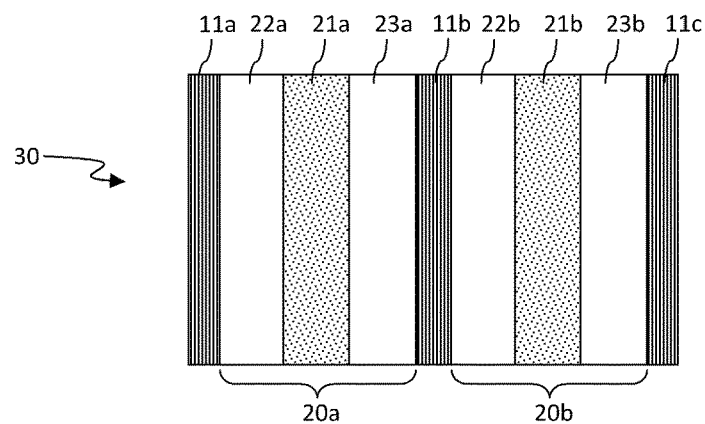
FIGS. 4A to 4C are cross-sectional views of an energy storage structure in accordance with other embodiments.

The embodiments disclosed herein describe electrodes that provide significantly improved battery recharge time and increased cycle life while maintaining high energy storage. These electrodes can offer increased form factor freedom as they can be fabricated in thin-film battery formats, and are thus flexible and adaptable to a wide variety of different portable electronic devices. The disclosed energy storage devices incorporating the electrodes can also operate at higher power densities, and can have a reduced recharge time and a longer cycle life. As the energy storage devices are in thin-film battery formats, combustibility issues associated with conventional lithium ion batteries, which may arise from the pyrophoric elemental lithium and organic solvent electrolytes that are typically used in the construction of such batteries, can be avoided. The energy storage devices or batteries fabricated according to the disclosed embodiments can also be biodegradable.

Electrode

The disclosed embodiments provide an electrode 10 having at least one active material layer 12 and at least one graphitized carbon structure layer 11 (FIG. 1A). The active material layer 12 includes an active metal ion complex. In some embodiments, the active metal ion complex includes an active metal center and at least one ligand. The active metal center can form a redox couple. Thus in some embodiments, the active metal ion complex includes a redox couple and at least one ligand. Examples of the redox couple include $Co^{3+}/Co^{2+}$, $Pb^{4+}/Pb^{2+}$, $Ce^{4+}/Ce^{3+}$, $Tl^{3+}/Tl^+$, $Fe^{3+}/Fe^{2+}$, $Zn^{2+}/Zn(s)$, $Fe^{2+}/Fe(s)$, $Cr^{3+}/Cr^{2+}$, $V^{3+}/V^{2+}$, $V^{4+}/V^{5+}$, $Cu/Cu^{2+}$, $Li/Li^+$, $Ni^{2+}/Ni(s)$, or any combination thereof. In some embodiments, the at least one ligand includes methanolamine, ethanolamine, di-ethanesulfonate, x-methanesulfonate, x-trifluoromethane sulfonate, thiocyanate, or any combination thereof.

In some embodiments, the active metal ion complex is partially-ligated. The active metal center can be complexed with the at least one ligand to remain in an ionic form, which can improve the overall ionic and electric conductivity of the electrode 10. The active metal center acts analogously to the anolyte stream or the catholyte stream of a conventional flow battery, and provides sites for counter ions to attach to and/or detach from during charging and discharging. In some embodiments, the active metal ion complex further includes at least one counter ion. In some embodiments, the at least one counter ion includes $BF_4^-$, $Cl^-$, $Br^-$, $CF_3SO_3^-$, $Na^+$, $K^+$, $Li^+$, $Cs^+$, $Ca^{2+}$, $Mg^{2+}$, $PF_6^-$, $ClO_3^-$, $NO_3^-$, $C_7H_5O_3^-$, or any combination thereof.

In some embodiments, the graphitized carbon structure layer 11 includes graphitized poly-acrylonitrile fibers, vapor-grown carbon fibers, pyrolytic carbon nanotubes, carbon aerogels, graphitized activated carbon fibers, exfoliated graphite, graphene, or any combination thereof. The graphitized carbon structure layer 11 may have a range of porosities, for example, about 5% to about 99% by volume. The graphitized carbon structure layer 11 may alternatively be substantially non-porous, for example, less than about 5% by volume.

In some embodiments, as depicted in FIG. 1B, the electrode 10 further includes a layer of carbon nanotubes 13 disposed between the active material layer 12 and the graphitized carbon structure layer 11. In other embodiments, the active material layer 12 is adjacent to the graphitized carbon structure layer 11. In some embodiments, the layer of carbon nanotubes 13 interfaces between the active material layer 12 and the graphitized carbon structure layer 11. The carbon nanotubes, when disposed between the active material layer 12 and the graphitized carbon structure layer 11 can provide maximal contact with the active metal centers. This can minimize ohmic losses from electron injection and/or extraction during operation of the electrode. In some embodiments, the graphitized carbon structure layer and/or carbon nanotubes may be at least partially incorporated into the active material layer 12.

The electrode 10 may be an amorphous semi-solid. Accordingly, the electrode 10 may accommodate restructuring during charge and discharge cycles and eliminate life-limiting morphological hysteresis that is typically seen in lithium ion batteries. Many high energy batteries based on intercalation, such as lithium ion batteries, may undergo irreversible morphological changes that can limit battery cycle life Active Material Stack With reference to FIG. 2, the disclosed embodiments provide an active material stack 20 having a positive active material layer 22, a negative active material layer 23, and an electrolyte layer 21 disposed between the positive active material layer and the negative active material layer. In some embodiments, the positive active material layer 22 is in contact with the electrolyte layer 21. In some embodiments, the negative active material layer 23 is in contact with the electrolyte layer 21. In some embodiments, the positive active material layer 22 is in contact with the electrolyte layer, and the negative active material layer 23 is in contact with the electrolyte layer 21. The electrolyte layer 21 provides a medium for counter-ion movement between the positive active material layer 22 and the negative active material layer 23. In some embodiments, the electrolyte layer 21 has a thickness of less than or equal to about 1 μm thick. In some embodiments, the electrolyte layer 21 has a thickness of less than or equal to about 50 μm. In some embodiments, the electrolyte layer 21 has a thickness of about 1 μm to about 50 μm. In some embodiments, the electrolyte layer 21 has a thickness of about 5 μm to about 40 μm. In some embodiments, the electrolyte layer 21 has a thickness of about 5 μm to about 25 μm. For example, the electrolyte layer 21 may have a thickness of about 0.5 μm, about 1 μm, about 5 μm, about 10 μm, about 15 μm, about 20 μm, about 25 μm, about 30 μm, about 35 μm, about 40 μm, about 45 μm, about 50 μm, or a thickness between any of these values.

In some embodiments, each of the positive active material layer 22 and the negative active material layer 23 includes an active metal ion complex as described above. The active ion complex may include an active metal center and at least one ligand. As described above, the active metal center can form a redox couple. Thus in some embodiments, the active metal ion complex includes a redox couple and at least one ligand. In some embodiments, each of the positive active material layer and the negative active material layer includes at least one partially-ligated metal complex. In some embodiments, the at least one partially-ligated metal complex in the positive active material layer 22 includes at least one metal ion selected from $Co^{3+}$, $Pb^{4+}$, $Ce^{4+}$, $Tl^{3+}$, $Fe^{3+}$, and any combination thereof. In some embodiments, the at least one partially-ligated metal complex in the negative active material layer 23 includes at least one metal ion selected from $Zn^{2+}$, $Fe^{2+}$, $Cr^{3+}$, $V^{3+}$, $Ni^{2+}$, and any combination thereof. In some embodiments, the graphitized carbon structure layer and/or carbon nanotubes may at least be partially incorporated into the positive active material layer 22. In some embodiments, the graphitized carbon structure layer and/or carbon nanotubes may at least be partially incorporated into the negative active material layer 23. The incorporation of the graphitized carbon structure layer and/or carbon nanotubes into the positive active material layer 22 and/or the negative active material layer 23 can aid in electron injection and/or extraction between the current collectors and the positive active material layer 22, and/or between the current collectors and the negative active material layer 23.

In some embodiments, the at least one active metal ion complex (for example, the at least one partially-ligated metal complex) includes at least one counter ion and at least one ligand. The counter ion transfers charge between the positive active material layer 22 and the negative active material layer 23. In some embodiments, the at least one counter ion includes $BF^{4-}$, $Cl^-$, $Br$, $CF_3SO_3^-$, $Na^+$, $K^+$, $Li^+$, $Cs^+$, $Ca^{2+}$, $Mg^{2+}$, or any combination thereof. The selection of the counter ion may be based on the composition and the ligating activity of the active metal centers, and the type of electrolyte layer in the active material stack 20. In some embodiments, the at least one ligand includes methanolamine, ethanolamine, di-ethanesulfonate, x-methanesulfonate, x-trifluoromethane sulfonate, thiocyanate, or any combination thereof.

In some embodiments, the electrolyte layer 21 includes a cation exchange material, an anion exchange material, an amphoteric exchange material, or any combination thereof. In some embodiments, the cation exchange material is perfluoro-sulfonic acid (PFSA) polymer, sulfonated fluorinated poly(arylene ether), sulfonated poly(fluorenyl ether thioether ketone), PFSA/silica hybrid, PFSA/titania hybrid, PFSA/polypyrrole composite, PFSA/polyethylenimine composite, PFSA/polyvinylidine fluoride hybrid, or any combination thereof. In some embodiments, the anion exchange material is polybenzimidazole, diallyldimethylammonium chloride, diallyldimethylammonium chloride/chlorotrifluoro ethylene copolymer, 1,4-diazabicyclo(2,2,2) octane, polybenzimidazole/potassium hydroxide composite, poly(vinyl alcohol)/potassium hydroxide composite, poly(ethylene oxide)/lithium perchlorate/barium titanate composite, poly(vinyl alcohol)/poly(epichlorihydrine) hybrid, poly(phenyl oxide)/tetraethoxysilane hybrid, poly(vinyl alcohol)/alkoxysilane hybrid, or any combination thereof.

In some embodiments, the electrolyte layer participates in the complexing of the active metal center with the ligand in the active metal ion complex. This can help maximize the ionic conductivity from the electrolyte to the active metal center. For example, some of the cation exchange material, anion exchange material, and/or amphoteric exchange material in the electrolyte layer may partake in the partial or complete ligation of some or all of the active metal ion complexes in the positive active material layer 22 and/or the negative active material layer 23. In other words, a portion of the electrolyte layer 21 may be incorporated into the positive active material layer 22 and/or the negative active material layer 23. In some examples, only a portion of the active metal centers adjacent to the electrolyte layer 21 (for example, the active metal centers that reside within about 2 μm, or within about 1 μm, from the electrolyte layer) will undergo such partial or complete ligation.

Energy Storage Structure

With reference to FIG. 3A, the disclosed embodiments provide an energy storage. In some embodiments, the energy storage structure 30 includes a first graphitized carbon structure layer 11a and a second graphitized carbon structure layer 11b. The energy storage structure 30 may further include a first active material stack 20a disposed between the first graphitized carbon structure layer 11a and the second graphitized carbon structure layer 11b. The first active material stack 20a may include a first positive active material layer 22a, a first negative active material layer 23a, and a first electrolyte layer 21a disposed between the first positive active material layer 22a and the first negative active material layer 23a.

In some embodiments, as depicted in FIG. 3B, the energy storage structure 30 has a first layer of carbon nanotubes 13a disposed between the first active material stack 20a and the first graphitized carbon structure layer 11a. In some embodiments, the energy storage structure 30 has a second layer of carbon nanotubes 13b disposed between the first active material stack 20a and the second graphitized carbon structure layer 11b. The carbon nanotubes can provide maximal contact between the graphitized carbon structure layer and the active metal centers. Therefore, ohmic losses from electron injection and/or extraction between the first active material stack 20a and the first graphitized carbon structure layer 11a, or between the first active material stack 20a and the second graphitized carbon structure layer 11b, can be minimized.

In some embodiments, the first graphitized carbon structure layer 11a includes graphitized poly-acrylonitrile fibers, vapor-grown carbon fibers, pyrolytic carbon nanotubes, carbon aerogels, graphitized activated carbon fibers, exfoliated graphite, or any combination thereof. In some embodiments, the first graphitized carbon structure layer 11a has a thickness of about 5 μm to about 200 μm. In some examples, the first graphitized carbon structure layer 11a has a thickness of about 5 μm to about 200 μm about 20 μm to about 180 μm, about 40 μm to about 160 μm, about 60 μm to about 140 μm, or a thickness within any of these ranges (including endpoints). In further examples, the first graphitized carbon structure layer 11a has a thickness of about 5 μm, about 20 μm, about 40 μm, about 60 μm, about 80 μm, about 100 μm, about 120 μm, about 140 μm, about 160 μm, about 180 μm, about 200 μm, or a thickness between any of these values. In some embodiments, the first graphitized carbon structure layer 11a is made of pre-sintered clusters of about 50 fibers to about 5000 fibers, for example about 50 fibers, about 500 fibers, about 1000 fibers, about 2000 fibers, about 3000 fibers, about 4000 fibers, about 5000 fibers, or a number between any of these values. In some embodiments, the first graphitized carbon structure layer 11a is porous. In some embodiments, the first graphitized carbon structure layer 11a has a porosity of about 5% to about 99%. In some examples, the first graphitized carbon structure layer 11a has a porosity of about 5% to about 99%, about 5% to about 95%, about 15% to about 85%, about 25% to about 75%, about 35% to about 65%, or a porosity within any of these ranges (including endpoints). In further examples, the first graphitized carbon structure layer 11a has a porosity of about 5%, about 10%, about 20%, about 30%, about 40%, about 50%, about 60%, about 70%, about 80%, about 90%, about 99%, or a percentage between any of these values. In other embodiments, the first graphitized carbon structure layer 11a is substantially non-porous, in other words, less than or equal to about 5% porosity by volume.

In some embodiments, the second graphitized carbon structure layer 11b includes graphitized poly-acrylonitrile fibers, vapor-grown carbon fibers, pyrolytic carbon nanotubes, carbon aerogels, graphitized activated carbon fibers, exfoliated graphite, or any combination thereof. In some embodiments, the second graphitized carbon structure layer 11b has a thickness of about 5 μm to about 200 μm. In some examples, the second graphitized carbon structure layer 11a has a thickness of about 5 μm to about 200 μm, about 20 μm to about 180 μm, about 40 μm to about 160 μm, about 60 μm to about 140 μm, or a thickness within any of these ranges (including endpoints). In further examples, the second graphitized carbon structure layer 11b has a thickness of about 5 μm, about 20 μm, about 40 μm, about 60 μm, about 80 μm, about 100 μm, about 120 μm, about 140 μm, about 160 μm, about 180 μm, about 200 μm, or a thickness between any of these values. In some embodiments, the second graphitized carbon structure layer 11b is made of pre-sintered clusters of about 50 fibers to about 5000 fibers, for example about 50 fibers, about 500 fibers, about 1000 fibers, about 2000 fibers, about 3000 fibers, about 4000 fibers, about 5000 fibers, or a number between any of these values. In some embodiments, the second graphitized carbon structure layer 11b is porous. In some embodiments, the second graphitized carbon structure layer 11b has a porosity of about 5% to about 99%. In some examples, the second graphitized carbon structure layer 11a has a porosity of about 5% to about 99%, about 5% to about 95%, about 15% to about 85%, about 25% to about 75%, about 35% to about 65%, or a porosity within any of these ranges (including endpoints). In further examples, the second graphitized carbon structure layer 11b has a porosity of about 5%, about 10%, about 20%, about 30%, about 40%, about 50%, about 60%, about 70%, about 80%, about 90%, about 99%, or a percentage between any of these values. In other embodiments, the second graphitized carbon structure layer 11b is substantially non-porous, in other words, less than or equal to about 5% porosity by volume.

In some embodiments, the first positive active material layer 22a has a thickness of about 50 μm to about 5000 μm. In some examples, the first positive active material layer 22a has a thickness of about 50 μm to about 5000 μm, about 100 μm to about 4000 μm, about 200 μm to about 3000 μm, about 500 μm to about 2000 μm, or a thickness within any of these ranges (including endpoints). In further examples, the first positive active material layer 22a has a thickness of about 50 μm, about 1000 μm, about 2000 μm, about 3000 μm, about 4000 μm, about 5000 μm, or a thickness between any of these values. In some embodiments, the first negative active material layer 23a has a thickness of about 50 μm to about 5000 μm. In some examples, the first negative active material layer 23a has a thickness of about 50 μm to about 5000 μm, about 100 μm to about 4000 μm, about 200 μm to about 3000 μm, about 500 μm to about 2000 μm, or a thickness within any of these ranges (including endpoints). In further examples, the first negative active material layer 23a has a thickness of about 50 μm, about 1000 μm, about 2000 μm, about 3000 μm, about 4000 μm, about 5000 μm, or a thickness between any of these values. The thickness and the area of the first positive active material layer 22a and the first negative active material layer 23a can determine the capacity of the energy storage structure 30. In some embodiments, the first positive active material layer 22a and the first negative active material layer 23a have a combined volume of about 60% to about 85% of the total volume of the energy storage structure 30. In some examples, the combined volume (as percentage of the total volume of the energy storage structure 30) is about 60% to about 85%, about 65% to about 80%, about 70% to about 75%, or a percentage within any of these ranges (including endpoints). In further examples, the combined volume (as percentage of the total volume of the energy storage structure 30) is about 60%, about 65%, about 70%, about 75%, about 80%, about 85%, or a percentage between any of these values. In some embodiments, the positive active material layer 22a and/or the negative active material layer 23a includes about 10% to about 50% by volume of graphitized carbon structures and/or carbon nanotubes, including about 10%, about 20%, about 30%, about 40%, about 50%, or a percentage between any of these values.

In some embodiments, the first electrolyte layer 21a has a thickness of less than or equal to about 1 µm. In some embodiments, the first electrolyte layer 21a has a thickness of about 1 µm to about 50 µm. In some examples, the first electrolyte layer 21a has a thickness of about 1 µm to about 50 µm, about 5 µm to about 40 µm, about 10 µm to about 30 µm, about 20 µm to about 25 µm, or a thickness within any of these ranges (including endpoints). In further examples, the first electrolyte layer 21a has a thickness of less than about 1 µm, about 1 µm, about 5 µm, about 10 µm, about 20 µm, about 25 µm, about 30 µm, about 40 µm, about 50 µm, or a thickness between any of these values.

In some embodiments, as depicted in FIG. 4A, the energy storage structure 30 further includes at least a second active material stack 20b disposed between the second graphitized carbon structure layer 11b and a third graphitized carbon structure layer 11c. The second active material stack 20b has a second positive active material layer 22b, a second negative active material layer 23b, and a second electrolyte layer 21b disposed between the second positive active material layers 22b and the second negative active material layers 23b.

In some embodiments, the third graphitized carbon structure layer 11c includes graphitized poly-acrylonitrile fibers, vapor-grown carbon fibers, pyrolytic carbon nanotubes, carbon aerogels, graphitized activated carbon fibers, exfoliated graphite, or combinations thereof. In some embodiments, the third graphitized carbon structure layer 11c has a thickness of about 5 µm to about 200 µm. In some examples, the third graphitized carbon structure layer 11c has a thickness of about 5 µm to about 200 µm, about 20 µm to about 180 µm, about 40 µm to about 160 µm, about 60 µm to about 140 µm, or a thickness within any of these ranges (including endpoints). In further examples, the third graphitized carbon structure layer 11c has a thickness of about 5 µm, about 20 µm, about 40 µm, about 60 µm, about 80 µm, about 100 µm, about 120 µm, about 140 µm, about 160 µm, about 180 µm, about 200 µm, or a thickness between any of these values. In some embodiments, the third graphitized carbon structure layer 11c is made of pre-sintered clusters of about 50 fibers to about 5000 fibers, for example about 50 fibers, about 500 fibers, about 1000 fibers, about 2000 fibers, about 3000 fibers, about 4000 fibers, about 5000 fibers, or a number between any of these values. In some embodiments, the third graphitized carbon structure layer 11c is porous. In some embodiments, the third graphitized carbon structure layer 11c has a porosity of about 5% to about 99%. In some examples, the third graphitized carbon structure layer 11c has a porosity of about 5% to about 99%, about 5% to about 95%, about 15% to about 85%, about 25% to about 75%, about 35% to about 65%, or a porosity within any of these ranges (including endpoints). In further examples, the third graphitized carbon structure layer 11c has a porosity of about 5%, about 10%, about 20%, about 30%, about 40%, about 50%, about 60%, about 70%, about 80%, about 90%, about 99%, or a percentage between any of these values. In other embodiments, the third graphitized carbon structure layer 11c is substantially non-porous, in other words, less than or equal to about 5% porosity by volume.

In some embodiments, the second positive active material layer 22b has a thickness of about 50 µm to about 5000 µm. In some examples, the second positive active material layer 22b has a thickness of about 50 µm to about 5000 µm, about 100 µm to about 4000 µm, about 200 µm to about 3000 µm, about 500 µm to about 2000 µm, or a thickness within any of these ranges (including endpoints). In further examples, the second positive active material layer 22b has a thickness of about 50 µm, about 1000 µm, about 2000 µm, about 3000 µm, about 4000 µm, about 5000 µm, or a thickness between any of these values. In some embodiments, the second negative active material layer 23b has a thickness of about 50 µm to about 5000 µm. In some examples, the second negative active material layer 23b has a thickness of about 50 µm to about 5000 µm, about 100 µm to about 4000 µm, about 200 µm to about 3000 µm, about 500 µm to about 2000 µm, or a thickness within any of these ranges (including endpoints). In further examples, the second negative active material layer 23b has a thickness of about 50 µm, about 1000 µm, about 2000 µm, about 3000 µm, about 4000 µm, about 5000 µm, or a thickness between any of these values. In some embodiments, the second positive active material layer 22b and the second negative active material layer 23b have a combined volume of about 60% to about 85% of the total volume of the energy storage structure 30. In some examples, the combined volume (as percentage of the total volume of the energy storage structure 30) is about 60% to about 85%, about 65% to about 80%, about 70% to about 75%, or a percentage within any of these ranges (including endpoints). In further examples, the combined volume (as percentage of the total volume of the energy storage structure 30) is about 60%, about 65%, about 70%, about 75%, about 80%, about 85%, or a percentage between any of these values. In some embodiments, the active material layer 22a includes about 10% to about 50% by volume of graphitized carbon structures and/or carbon nanotubes, including about 10%, about 20%, about 30%, about 40%, about 50%, or a percentage between any of these values.

In some embodiments, the second electrolyte layer 21b has a thickness of about 1 µm to about 50 µm. In some examples, the second electrolyte layer 21b has a thickness of about 1 µm to about 50 µm, about 5 µm to about 40 µm, about 10 µm to about 30 µm, about 20 µm to about 25 µm, or a thickness within any of these ranges (including endpoints). In further examples, the second electrolyte layer 21b has a thickness of less than about 1 µm, about 1 µm, about 5 µm, about 10 µm, about 20 µm, about 25 µm, about 30 µm, about 40 µm, about 50 µm, or a thickness between any of these values.

Figure 4B:
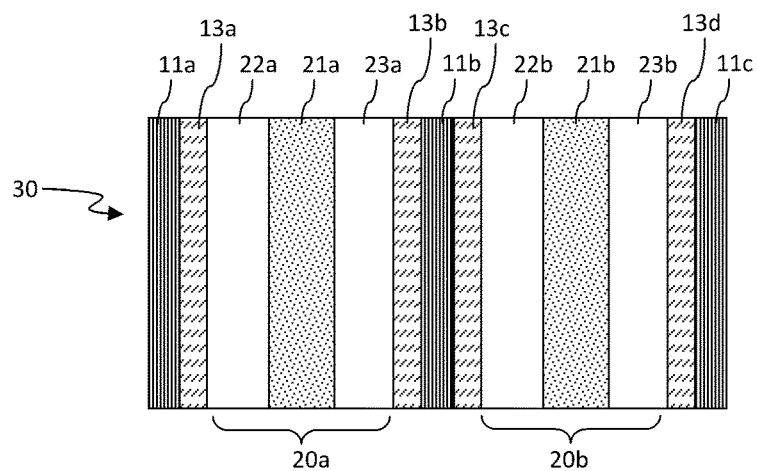

With reference to FIG. 4B, in some embodiments, the energy storage structure 30 further includes a layer of carbon nanotubes (13a-d) between each of the graphitized carbon structure layers (11a-c) and each of the active material stacks (20a and 20b). In other words, a first layer of carbon nanotubes 13a is disposed between the first active material stack 20a and the first graphitized carbon structure layer 11a; a second layer of carbon nanotubes 13b disposed between the first active material stack 20a and the second graphitized carbon structure layer 11b; a third layer of carbon nanotubes 13c disposed between the second graphitized carbon structure layer 11b and a second active material stack 20b; and a fourth layer of carbon nanotubes 13d disposed between the second active material stack 20b and the third graphitized carbon structure layer 11c. In some embodiments, the energy storage structure 30 further includes a conductive substrate adjacent to each of the two outermost graphitized carbon structure layers. The conductive substrates may function as current collectors. For example, a positive current collector 31a and a negative current collector 31b can be adjacent to each of the two outermost graphitized carbon structure layers (such as the first graphitized carbon structure layer 11a and the third graphitized carbon structure layer 11c), as shown in FIG. 4C.

Figure 5A:
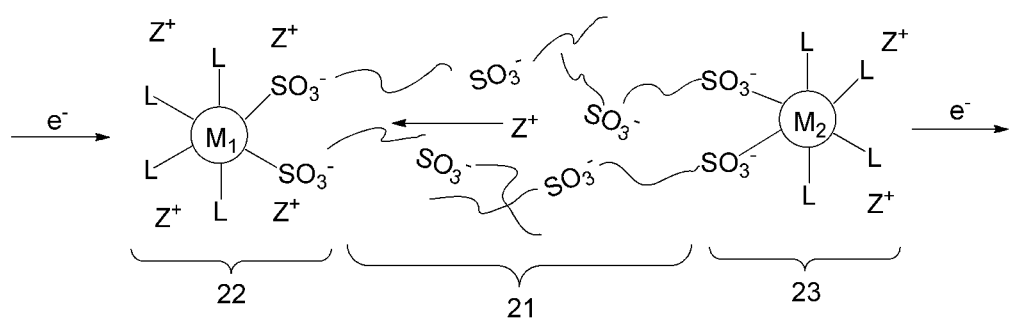
FIGS. 5A and 5B demonstrate the operation of a flow-based sealed battery cell during discharging and charging, respectively, in accordance with some embodiments.
Figure 5B:
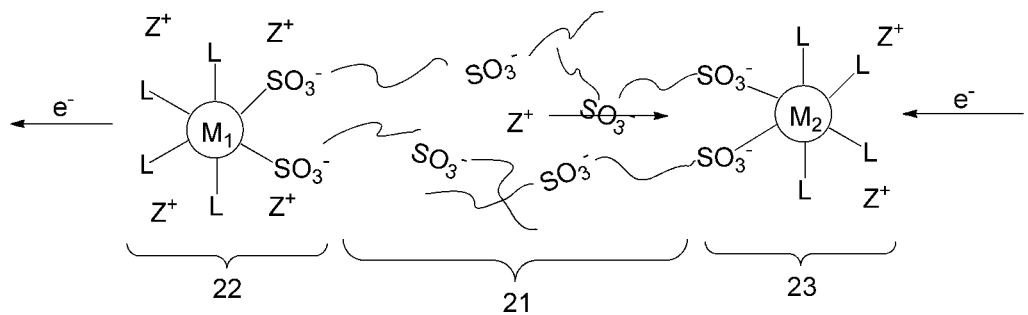

The energy storage structure 30 can be configured as a battery, such as a flow-based sealed battery. A general overview of the chemical processes occurring within an active material stack when configured into the flow-based sealed battery is illustrated in FIGS. 5A and 5B. During discharge (see FIG. 5A), electrons flow into the positive active material layer 22, causing reduction of the positive active metal centers $M_1$ within the positive active material layer 22, drawing counter ions $Z^+$ through the electrolyte layer 21 and causing the concomitant oxidation of the negative active metal centers $M_2$ in the negative active material layer 23. During charging of the energy storage device, the process reverses as depicted in FIG. 5B. With reference to FIG. 5B, the electrons flow into the negative active material layer 23, causing reduction of the negative active metal centers $M_2$ within the negative active material layer 23, drawing counter ions $Z^+$ through the electrolyte layer 21 and causing the concomitant oxidation of the positive active metal centers $M_1$ in the positive active material layer 22.

Figure 4C:
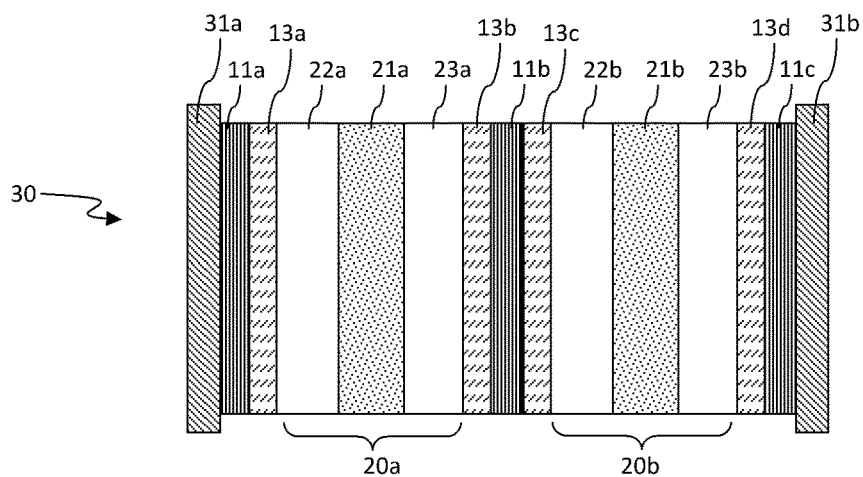

With reference to FIG. 4C, during the discharge cycle, electrons flow into the positive current collector 31a and through the first graphitized carbon structure layer 11a and the first layer of carbon nanotubes 13a towards the positive end of the first active material stack (cell) 20a. The electrons cause reduction reactions of the positive active metal centers within the first positive active material layer 22a, drawing counter ions through the electrolyte layer 21a and causing the concomitant oxidation of the negative active metal centers in the first negative active material layer 23a. The oxidation of the negative active metal centers releases a new set of electrons, which travel through the second layer of the carbon nanotubes 13b and the second graphitized carbon structure layer 11b towards the positive end of the next active material stack 20b and causes the entire process to repeat. This results in the eventual collection of electrons at the negative current collector 31b of the energy storage structure for utilization in the electronic device it powers. The positive and negative current collectors can be any conductive substrate that include at least one conductive material. In some embodiments, the conductive substrate (such as the positive and negative current collectors) is gold, carbon, coated stainless steel, copper, or other commonly employed current collecting materials.

Method of Making an Energy Storage Structure

The disclosed embodiments also provide a method of making an energy storage structure. The method includes forming a first graphitized carbon structure layer, disposing a first active material stack over the first graphitized carbon structure layer, and disposing a second graphitized carbon structure layer over the first active material stack. The first active material stack includes a first positive active material layer, a first negative active material layer, and a first electrolyte layer disposed between the first positive active material layer and the first negative active material layer. In some embodiments, the method further includes disposing a first layer of carbon nanotubes on the first graphitized carbon structure layer before disposing the first active material stack, and disposing a second layer of carbon nanotubes on the first active material stack before disposing the second graphitized carbon structure layer. Thus the first layer of carbon nanotubes is between the first graphitized carbon structure layer and the first active material stack, and the second layer of carbon nanotubes is between the first active material stack and the second graphitized carbon structure layer.

The first energy storage structure may be formed on a first conductive substrate, which will serve as a current collector. In such embodiments, the method further includes forming the first graphitized carbon structure layer on a first conductive substrate. In general, the graphitized carbon structure may be formed by (1) depositing a precursor material and then graphitizing it, for example, by pyrolysis, (2) growing the carbon structure of a desired surface area/porosity directly onto the conductive substrate, or (3) growing a graphitized carbon structure layer separately and then install it onto the conductive substrate.

In some embodiments, forming the first graphitized carbon structure layer includes depositing a solution comprising polymer fibers onto the first conductive substrate to form a layer of polymer fibers, coating the polymer fibers with a resin binder, and sintering the polymer fibers to form the graphitized carbon structure layer.

In some embodiments, the first graphitized carbon structure layer is formed by vapor-grown carbon fibers. The carbon fibers can be grown on the first conductive substrate using a chemical vapor deposition (CVD) process. A carbonaceous gas is heated to a high temperature within a reactor in order for it to be decomposed into disassociated carbon. These free carbon atoms are then deposited on the first conductive substrate through interaction with a catalyst. The catalyst particles cause the deposited carbon to grow into fibers, The type and size of the fibers are controlled by the specific conditions within the CVD reactor. In some embodiments, the vapor-grown carbon fibers can be grown separately, then deposited on the first conductive substrate in conjunction with an appropriate binder material. Examples of the carbonaceous gas include, but not limited to, benzene and methane. Examples of the catalyst include, but not limited to, iron and an iron-based compound.

In some embodiments, the first graphitized carbon structure layer is formed by pyrolytic carbon nanotubes that are grown directly onto the first conductive substrate using any pyrolysis growth method involving decomposition of a carbonaceous gas. The process is very similar to chemical vapor deposition described above.

In some embodiments, the first graphitized carbon structure layer is formed by a carbon aerogel. A carbon aerogel is an aerogel that includes carbon nanoparticles. Carbon aerogels can be produced by first creating an organic polymer aerogel (from materials such as resorcinol, melamine, or acetic acid) according to methods described in the literature. The polymer aerogel is then graphitized into a carbon aerogel using pyrolysis. Pyrolysis of polymer aerogel may be performed in situ after the layer is deposited onto the first conductive substrate, or alternately the carbon aerogel may be formed prior to being deposited onto the first conductive substrate.

In some embodiments, the first graphitized carbon structure layer is formed by an activated carbon, which is a highly porous form of bulk carbon. The graphitized carbon structure is made by depositing a layer pre-made fibers of activated carbon onto the first conductive substrate, then graphitizing the layer via a sintering process at high temperature. In some embodiments, the sintering temperature may be about 2500° C. at ambient conditions, or about 1600° C. under 5 GPa of pressure. Alternately, the sintering process may be performed before the graphitized activated carbon fibers are deposited onto the first conductive substrate.

In some embodiments, the first graphitized carbon structure layer is formed by exfoliated graphite. The exfoliated graphite can be produced from graphite intercalation compounds, a type of graphite that features systems of ions inserted between layers. To produce exfoliated graphite, the guest compound is vaporized (typically via heating), which causes the host graphite to expand greatly. The result is a "puffed up," low-density graphite structure that may function as a graphitized carbon structure material.

In some embodiments, the thickness of the deposited layer of polymer fibers may be about 5 µm to about 200 µm. For example, the thickness of the deposited layer of polymer fibers is about 5 µm to about 200 µm, about 20 µm to about 180 µm, about 40 µm to about 160 µm, about 60 µm to about 140 µm, or a thickness within any of these ranges (including endpoints). In some embodiments, the first graphitized carbon structure layer is porous. In some embodiments, the first graphitized carbon structure layer is substantially non-porous.

In some embodiments, disposing a first active material stack over the first graphitized carbon structure layer includes disposing a first positive active material layer over the first graphitized carbon structure layer, disposing a first electrolyte layer on the first positive active material layer, and disposing a first negative active material layer on the first electrolyte layer. Thus in some embodiments, disposing a first layer of carbon nanotubes on the first active material stack would include disposing a first layer of carbon nanotubes on the first negative active material layer.

In the embodiments where the energy storage structure contains only one active material stack, a second conductive substrate is disposed on the second graphitized carbon structure layer. In some embodiments where a second layer of carbon nanotubes is provided, the second graphitized carbon structure layer is disposed on the second layer of carbon nanotubes.

In other embodiments, two electrodes may be prepared separately and attached to the electrolyte layer on the opposite sides. For example, a first active material layer is deposited over the first graphitized carbon structure layer to form a first electrode, and a second active material layer is deposited over the second graphitized carbon structure layer to form a second electrode. In some embodiments, a first layer of carbon nanotubes may be deposited on the first graphitized carbon structure layer, and the first active material layer is deposited on the first layer of carbon nanotubes. In some embodiments, a second layer of carbon nanotubes may be deposited on the second graphitized carbon structure layer, and the second active material layer is deposited on the second layer of carbon nanotubes. The energy storage structure (in other words, a bipolar stack) can be assembled by combining the first electrode and the second electrode, with the first electrolyte layer in between and the first active material layer and the second active material layer facing the first electrolyte layer. In some embodiments, a layer of the first electrolyte solution may be cast onto the first active material layer, and the second electrode is then disposed on the first electrolyte layer with the second active material layer facing the first electrolyte layer.

In some embodiments, forming a positive active material layer (herein refers generally to the first positive active material layer, second positive active material layer and other additional positive active material layers) over the graphitized carbon structure layer (herein refers generally to the first graphitized carbon structure layer, second graphitized carbon structure layer and other additional graphitized carbon structure layers) includes depositing a layer of a positive active metal solution containing a redox couple, a ligand, and a counter ion over the graphitized carbon structure layer. In some embodiments, the layer of the positive active metal solution is deposited on the graphitized carbon structure layer. In other embodiments, the layer of the positive active metal solution is deposited on the layer of carbon nanotubes (herein refers generally to the first carbon nanotubes, the second carbon nanotubes, the third carbon nanotubes, the fourth layer of carbon nanotubes and any other additional layers of carbon nanotubes). In some embodiments, the thickness of the deposited positive active material layer is about 50 µm to about 5000 µm. In some examples, the thickness of the deposited positive active material layer is about 50 µm to about 5000 µm, about 100 µm to about 4000 µm, about 200 µm to about 3000 µm, about 500 µm to about 2000 µm, or a thickness within any of these ranges (including endpoints). The positive active material layer may be deposited from an aqueous or non-aqueous solution wherein the positive metal complex is pre-formed (metal center complex plus ligand set) and deposits through heating/evaporation of the carrier solvent to achieve the desired thickness.

In some embodiments, an electrolyte solution is deposited or cast on the positive active material layer to form an electrolyte layer (herein refers generally to the first electrolyte layer, the second electrolyte layer and other additional electrolyte layers). The deposited electrolyte layer may have a thickness of less than about 1 µm. The deposited electrolyte layer may alternatively have a thickness of about 1 µm to about 50 µm. In some examples, the deposited electrolyte layer has a thickness of less than about 1 µm, about 1 µm to about 50 µm, about 5 µm to about 40 µm, about 10 µm to about 30 µm, about 20 µm to about 25 µm, or a thickness within any of these ranges (including endpoints). The electrolyte layer, formed from polymers or polymer/ceramic blends described above, may be deposited as solutions via organic solvents, where the solvent carrier is removed through heating/evaporation to achieve the desired electrolyte thickness.

In some embodiments, forming a negative active material layer (herein refers generally to the first negative active material layer, second negative active material layer and other additional negative active material layers) on the electrolyte includes depositing a layer of the negative active metal solution containing a redox couple, a ligand, and a counter ion on the electrolyte layer. In some embodiments, the thickness of the deposited negative active material layer is about 50 µm to about 5000 µm. In some examples, the thickness of the deposited negative active material layer is about 50 µm to about 5000 µm, about 100 µm to about 4000 µm, about 200 µm to about 3000 µm, about 500 µm to about 2000 μm, or a thickness within any of these ranges (including endpoints). The negative active material layer may be deposited from an aqueous or non-aqueous solution wherein the positive metal complex is pre-formed (metal center complex plus ligand set) and deposits through heating/evaporation of the carrier solvent to achieve the desired thickness.

The total combined volume of the positive and the negative active material layers may be about 60% to about 85% of the total volume of the energy storage structure. For example, the total combined volume (as a percentage of the total volume of the energy storage structure) is about 60% to about 85%, about 65% to about 80%, about 70% to about 80%, or a percentage within any if these ranges (including endpoints). In some embodiments, the total combined volume of the first and the second active material layers may be about 75% of the total volume of the energy storage structure.

A battery stack may be formed by repeating a number of the energy storage structures (in other words, battery cells). Two conductive substrates may contact the two outer graphitized carbon structure layers to collect currents, and are thus positive and negative current collectors.

Suitable deposition techniques for the graphitized carbon structure layers, the layers of carbon nanotubes, the active material layers, and the electrolyte layers described above may include ultrasonic spray coating, spin coating, solution casting, screen printing, hot roll coating, decal transfer, and all related techniques. These layers are sequentially deposited in the appropriate order as depicted in FIGS. 4A-4C until a battery with the desired power is realized. The power achievable by the battery will be a product of the battery stack voltage and the operating current density. The battery stack voltage can be controlled by the number of battery cells that are sequentially deposited, while the area/thickness of the active material layers will determine the battery capacity. Because the battery chemistry is based on flow battery chemistries, it is inherently capable of high current density operation. This results in high available C-rate ranges of the battery, enabling short recharge times and high power discharge configurations to be realized.

System Performance

The embodiments disclosed herein utilize the operational principles of flow-based batteries and a semi-solid conductive structure to create an energy storage device with excellent power and energy densities, high flexibility of form, and a long device lifetime.

The embodiments make use of redox couples that have large differences in redox potential and/or involve two or more electrons per transfer, which produces an open-circuit voltage that is significantly higher than that of current flow batteries. Redox couples can be selected such that their standard redox potentials are adequately disparate to yield open circuit voltages in excess of 2.0 V.

Table 1 below lists some positive/negative redox couples that utilize a combination of either multi-electron transfers, and/or sufficiently positive/negative redox potentials to provide active metal centers with the requisite energy densities. In some embodiments, these systems do not involve the generation/consumption of protons/hydroxide ions so as to be amenable to non-aqueous media. In some embodiments, some of the negative couples for the negative active material may represent plating systems. It is expected that reversible plating of these metals will occur on the carbon nanotubes. However, adequately distributed carbon nanotubes can minimize the dendrite formation and the morphological hysteresis that would follow, so it does not limit the cycle life of these systems. In some cases, the selection of ligand can aid in the suppression of dendrite formation. In some embodiments, the use of di-ethanolamine with the Zn reduction couple at the negative active material may reduce dendrite formation.

TABLE 1

Redox couples for the active metal centers.

| Positive couple | $E_0$ ½ (V) | Negative couple | $E_0$ ½ (V) |
| --- | --- | --- | --- |
| $Co^{3+} + e- \leftrightarrow Co^{2+}$ | 1.82 | $Zn^{2+} + 2e- \leftrightarrow Zn(s)$ | −0.76 |
| $Pb^{4+} + 2e- \leftrightarrow Pb^{2+}$ | 1.69 | $Fe^{2+} + 2e- \leftrightarrow Fe(s)$ | −0.44 |
| $Ce^{4+} + e- \leftrightarrow Ce^{3+}$ | 1.44 | $Cr^{3+} + e- \leftrightarrow Cr^{2+}$ | −0.42 |
| $Tl^{3+} + 2e- \leftrightarrow Tl^{+}$ | 1.25 | $V^{3+} + e- \leftrightarrow V^{2+}$ | −0.26 |
| $Fe^{3+} e- \leftrightarrow Fe^{2+}$ | 0.77 | $Ni^{2+} + 2e- \leftrightarrow Ni(s)$ | −0.25 |

Table 2 shows a sample list of ligands and the accompanying counter ions that can be selected in some embodiments. Preferred ligands include compounds which are a) capable of partially/wholly fulfilling the coordination requirements of the active metal center, and b) capable of ionic conduction of the mobile counter ion. For example, two general classes of active metal center complexes that are candidates are shown. Class A involves uncharged ligands that partially/wholly satisfy the coordination sphere of the active metal center, but do not change its valence. The still-positive valence of the complex is balanced partially/wholly by the use of the listed counter ions in the second column. Because the counter ions in this example are negatively charged, anion-exchange membranes are selected as battery electrolytes. Since these counter ions are also involved in the ionic conduction required for the battery charge/discharge, the ionic losses through the electrode layer for the battery are minimized. It is expected that other active metal center candidates from Table-1 will yield molarities in excess of 5 M when combined with redox metal centers with 1-2 electrons per transfer at >2 V open circuit.

Class B ligands in Table 2 involve the use of charged ligands, which yield an active metal complex with an overall negative charge. This charge is balanced with the associated cations given in column 2. As in the previous example, because these cations are also the mobile ionic species for the battery, the electrode ohmic losses are minimized. Note that other negatively charged ligands may be used in combination to some degree with the listed candidate ligands L to achieve desired properties of the active metal center phases (high electron content, resistance to dendrites in plating systems, high conductivity, high morphological stability, and so on). As the cations are the mobile ionic species, cation exchange membranes may be selected as the electrolytes.

TABLE 2

List of ligands, counter ions, and active metal centers pairings.

| Class | Non-limiting Example Candidate Ligands = L | Counter ion = X | Negative active material complex (i = coordination #) | Positive active material complex (j = coordination #) | Electrolyte |
|---|---|---|---|---|---|
| A | Methanolamine (MEA) $CH_2OHNH_2$<br>Ethanolamine (EA) $CH_2OHCH_2NH_2$<br>Di-ethanolamine (DEA) $(CH_2OHCH_2)_2NH$ | $BF_4{-}$, $Cl{-}$, $Br{-}$, $CF_3SO_3^-$ | $Zn^{2+}(MEA)_i(BF_4{-})_2$ | $Pb^{4+}(DEA)_j(BF_4{-})_4$ | Anion-exchange polymer |
| B | X-Methanesulfonate (MSA) $(CH_3SO_3^-)X^+$<br>X-Trifluoromethane-sulfonate (TFMSA) $(CF_3SO_3^-)X^+$<br>Thiocyanate $SCN{-}$ | $Na^+$, $K^+$, $Li^+$, $Cs^+$, $Ca^{2+}$, $Mg^{2+}$ | $Zn(CF_3SO_3^-)_i(Na^+)_{i-2}$ | $Pb(CF_3SO_3^-)_j(Na^+)_{j-4}$ | Cation-exchange polymer |

EXAMPLE

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Lead-Zinc Flow-Based Sealed Battery

Figure 6A:
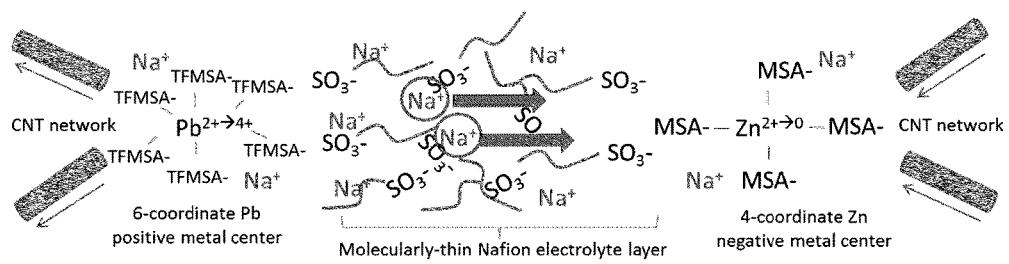
FIGS. 6A and 6B demonstrate the operation of a flow-based sealed battery cell during charging and discharging, respectively, in accordance with other embodiments.
Figure 6B:
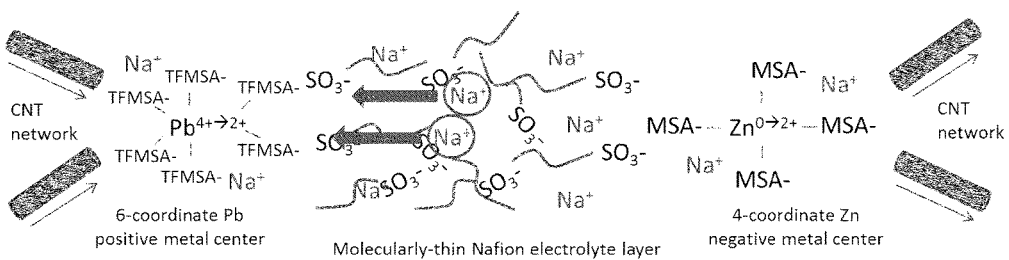

An illustrative example of a flow-based sealed battery uses trifluoromethane-sulfonate coordinated lead ions as the positive active metal centers and methane-sulfonate coordinated zinc ions as the negative active metal centers, with sodium as the counter ion and NAFION® (a trademarked product of E. I. DU PONT DE NEMOURS AND COMPANY CORPORATION, Delaware, USA) as the preferred electrolyte material. FIGS. 6A and 6B demonstrate the operation of this embodiment during both charging and discharging, respectively.

The ligands attached to both active metal centers are all negatively charged, which renders each of the active metal centers having a net negative charge. The depicted coordination numbers for these metal centers are notional and will depend on the ligand, metal center, and effective solvent environment. The methanesulfonate/trifluoromethanesulfonate ligands are expected to have very high ionic conductivity for the negative/positive metal centers, respectively, with the fluorinated ligands being provided on the positive metal center to impart resistance to oxidative damage. The $Na^+$ ions depicted are balanced for the ligands (assuming the given coordination numbers) and the metal valence changes, which are conducted through the NAFION® electrolyte (shown in the $Na^+$ form). Preferably, the functional electrolyte (NAFION®) is provided in the same ionic form as the intended mobile ions for the battery. As shown in FIGS. 6A and 6B, the active metal centers may be only partially complexed with the ligands. Satisfying the coordination sphere of the metal centers can also be accomplished partially with other ligands that, depending on their structure and ionic state, may or may not change the net charge on the active metal center. This can include the partial complexation by ligands directly from the functional electrolyte layer. Again, the exact ligand makeup for maximizing the desired functional properties of the battery would need to be determined empirically.

This embodiment has several unique advantages over conventional battery technology. First, the lead-zinc flow-based sealed battery is capable of both a higher open-circuit voltage and a greatly increased active metal molarity than other flow batteries. This results in a much higher energy density than conventional flow batteries, which is one of the most important metrics of battery performance. This embodiment also holds several advantages over lithium-ion batteries. First, this embodiment has very high power density due to the intimate ion contact of the positive and negative active metal centers, resulting in rates of charge and discharge which are expected to be ~10 times higher than conventional Li-ion batteries. Second, the thin-film bipolar nature of the individual active material layers of the flow-based sealed battery allows easy formation of a bipolar battery stack (as shown in FIG. 4C), which gives it much greater freedom of form factor and voltage-current characteristics than is possible with individual Li-ion cells. Finally, the structure of the flow-based sealed battery eliminates the two main factors that produce long-term damage to Li-ion batteries (morphological electrode transformation and insoluble deposits within the cell), which gives flow-based sealed battery a much longer lifetime.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An energy storage structure comprising:
   a first graphitized carbon structure layer;
   a second graphitized carbon structure layer;
   wherein one or both of the first graphitized carbon structure layer and the second graphitized carbon structure layer comprise graphitized poly-acrylonitrile fibers, vapor-grown carbon fibers, graphitized activated carbon fibers, or any combination thereof;
   a first active material stack disposed between the first graphitized carbon structure layer and the second graphitized carbon structure layer; wherein the first active material stack comprises:
      a first positive active material layer;
      a first negative active material layer, wherein each of the first positive active material layer and the first negative material layer includes at least one active metal ion complex comprising of at least one counter ion and at least one ligand, and wherein the at least one ligand comprises methanolamine, ethanolamine, di-ethanesulfonate, x-methanesulfonate, x-trifluoromethanesulfonate, thiocyanate, or any combination thereof;
      a first electrolyte layer disposed between the first positive active material layer and the first negative active material layer; and
      a first layer of carbon nanotubes disposed between the first active material stack and the first graphitized carbon structure layer; a second layer of carbon nanotubes disposed between the first active material stack and the second graphitized carbon structure layer, or both.

2. The energy storage structure of claim 1, wherein one or both of the first graphitized carbon structure layer and the second graphitized carbon structure layer have a thickness of about 5 μm to about 200 μm.

3. The energy storage structure of claim 1, wherein one or both of the first graphitized carbon structure layer and the second graphitized carbon structure layer have a porosity of about 5% to about 99%.

4. The energy storage structure of claim 1, wherein one or both of the first graphitized carbon structure layer and the second graphitized carbon structure layer are substantially non-porous.

5. The energy storage structure of claim 1, wherein one or both of the first positive active material layer and the first negative active material layer have a thickness of about 50 μm to about 5000 μm.

6. The energy storage structure of claim 1, wherein the first positive active material layer and the first negative active material layer have a combined volume of about 60% to about 85% of the total volume of the energy storage structure.

7. The energy storage structure of claim 1, wherein the first electrolyte layer has a thickness of about 1 μm to about 50 μm.

8. The energy storage structure of claim 1, further comprising at least a second active material stack disposed between the second graphitized carbon structure layer and a third graphitized carbon structure layer, wherein the second active material stack comprises:
a second positive active material layer;
a second negative active material layer, wherein each of the second positive active material layer and the second negative material layer includes at least one active metal ion complex comprising of at least one counter ion and at least one ligand, wherein the at least one ligand comprises methanolamine, ethanolamine, di-ethanesulfonate, x-methanesulfonate, x-trifluoromethanesulfonate, thiocyanate, or any combination thereof; and
a second electrolyte layer disposed between the second positive active material layer and the second negative active material layer.

9. The energy storage structure of claim 8, wherein the third graphitized carbon structure layer comprises graphitized poly-acrylonitrile fibers, vapor-grown carbon fibers, pyrolytic carbon nanotubes, carbon aerogels, graphitized activated carbon fibers, exfoliated graphite, or any combination thereof.

10. The energy storage structure of claim 8, wherein the third graphitized carbon structure layer has a thickness of about 5 μm to about 200 μm.

11. The energy storage structure of claim 8, wherein the third graphitized carbon structure layer has a porosity of about 5% to about 99%.

12. The energy storage structure of claim 8, wherein the third graphitized carbon structure layer is substantially non-porous.

13. The energy storage structure of claim 8, wherein one or both of the second positive active material layer and the second negative active material layer have a thickness of about 50 μm to about 5000 μm.

14. The energy storage structure of claim 8, wherein the second positive active material layer and the second negative active material layer have a combined volume of about 60% to about 85% of the total volume of the energy storage structure.

15. The energy storage structure of claim 8, wherein the second electrolyte layer has a thickness of about 5 μm to about 40 μm.

16. The energy storage structure of claim 8, further comprising two current collectors adjacent to two outer graphitized carbon structure layers.

17. A method of making an energy storage structure, the method comprising:
forming a first graphitized carbon structure layer;
disposing a first active material stack over the first graphitized carbon structure layer, wherein the first active material stack comprises:
a first positive active material layer;
a first negative active material layer, wherein each of the first positive active material layer and the first negative material layer includes at least one active metal ion complex comprising of at least one counter ion and at least one ligand, and wherein the at least one ligand comprises methanolamine, ethanolamine, di-ethanesulfonate, x-methanesulfonate, x-trifluoromethanesulfonate, thiocyanate, or any combination thereof; and
a first electrolyte layer disposed between the first positive active material layer and the first negative active material layer;
disposing a second graphitized carbon structure layer over the first active material stack; wherein one or both of the first graphitized carbon structure layer and the second graphitized carbon structure layer comprise graphitized poly-acrylonitrile fibers, vapor-grown carbon fibers, graphitized activated carbon fibers, or any combination thereof;
disposing a first layer of carbon nanotubes over the first active material stack and the first graphitized carbon structure layer; and
disposing a second layer of carbon nanotubes over the first active material stack and the second graphitized carbon structure layer, or both.

18. The method of claim 17, wherein the first graphitized carbon structure layer is formed on a first conductive substrate.

19. The method of claim 18, wherein forming the first graphitized carbon structure layer comprises:
depositing a solution comprising polymer fibers onto the first conductive substrate to form a layer of polymer fibers;
coating the polymer fibers with a resin binder; and
sintering the polymer fibers to form the first graphitized carbon structure layer.

20. The method of claim 17, further comprising disposing a second conductive substrate on the second graphitized carbon structure layer.

21. The method of claim 17, further comprising:
disposing a second active material stack over the second graphitized carbon structure layer, wherein the second active material stack comprises:
a second positive active material layer;
a second negative active material layer, wherein each of the second positive active material layer and the second negative material layer includes at least one active metal ion complex comprising of at least one counter ion and at least one ligand, and wherein the at least one ligand comprises methanolamine, ethanolamine, di-ethanesulfonate, x-methanesulfonate, x-trifluoromethanesulfonate, thiocyanate, or any combination thereof; and a second electrolyte layer disposed between the second positive active material layer and the second negative active material layer; and disposing a third graphitized carbon structure layer over the second active material stack.

22. The method of claim 21, further comprising:

disposing a third layer of carbon nanotubes on the second graphitized carbon structure layer before disposing the second active material stack; and disposing a fourth layer of carbon nanotubes on the second active material stack before disposing the third graphitized carbon structure layer.

23. The method of claim 21, further comprising disposing a second conductive substrate on the third graphitized carbon structure layer.

\* \* \* \* \*